Dec. 21, 1954 — H. W. PARKER — 2,697,280
INSTRUMENT FOR LOCATING CELESTIAL BODIES
Filed Feb. 24, 1953 — 2 Sheets-Sheet 1
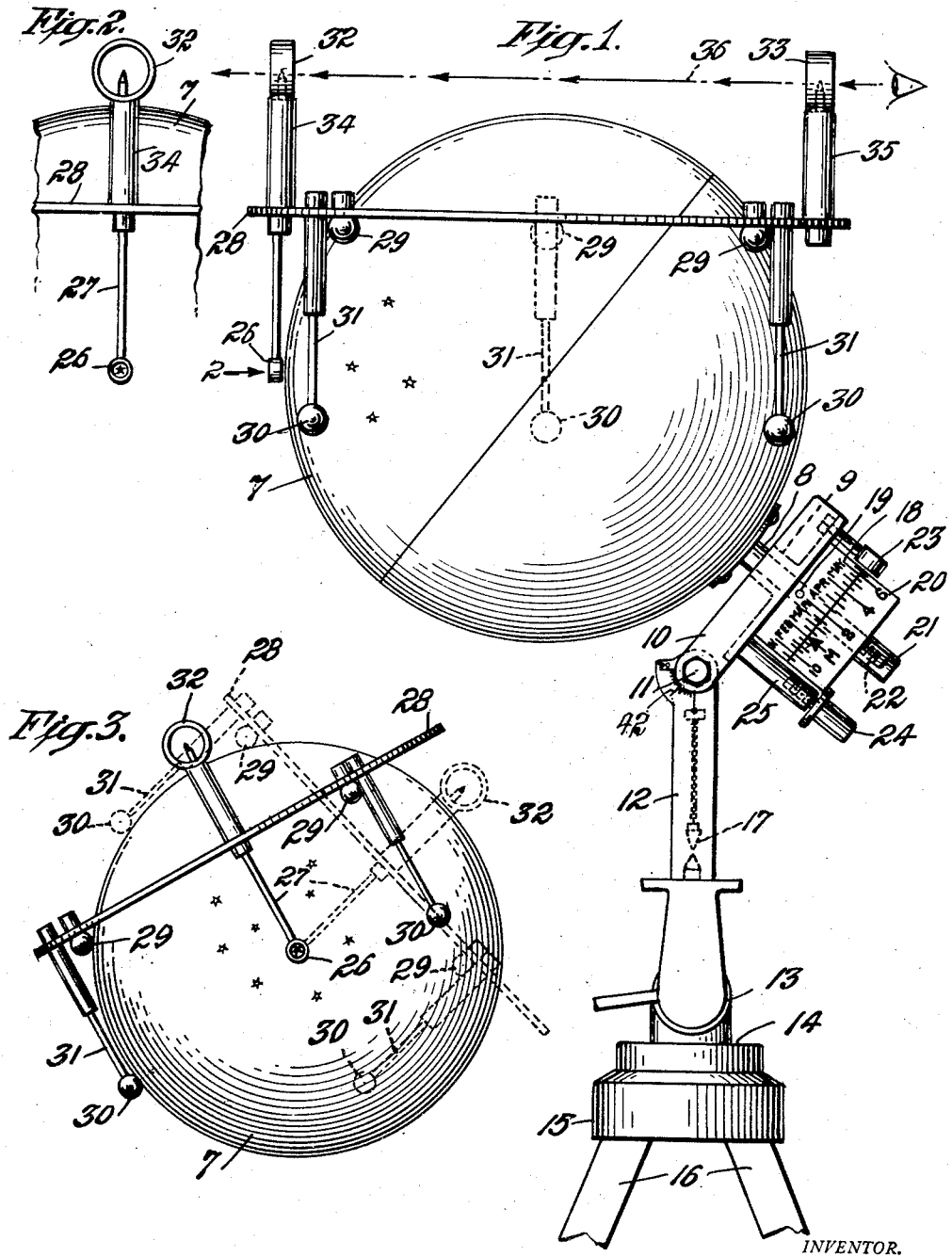
INVENTOR.
HENRY W. PARKER
BY
ATTORNEY Dec. 21, 1954　　　　H. W. PARKER　　　　2,697,280
INSTRUMENT FOR LOCATING CELESTIAL BODIES
Filed Feb. 24, 1953　　　　　　　　　　　　2 Sheets-Sheet 2
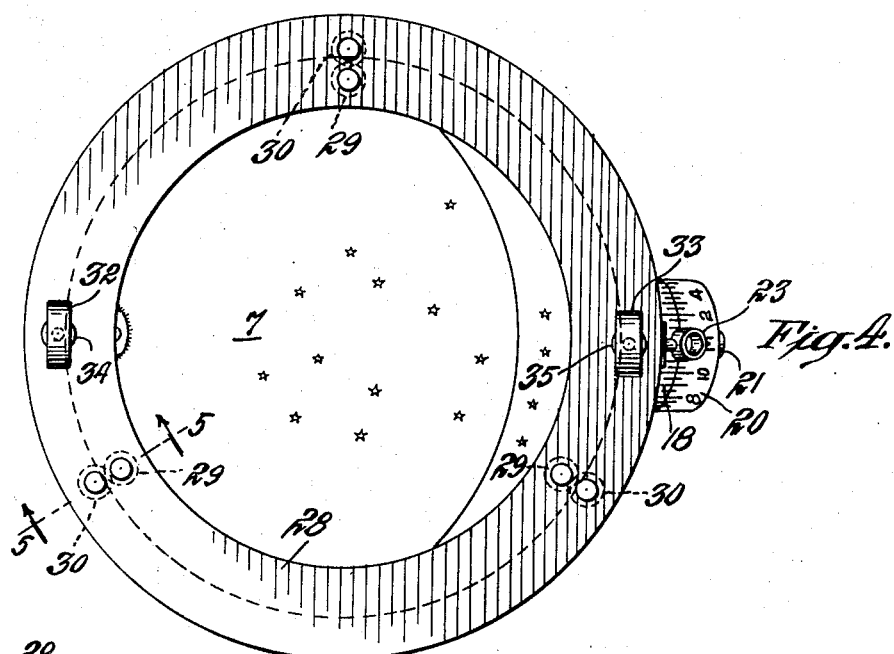
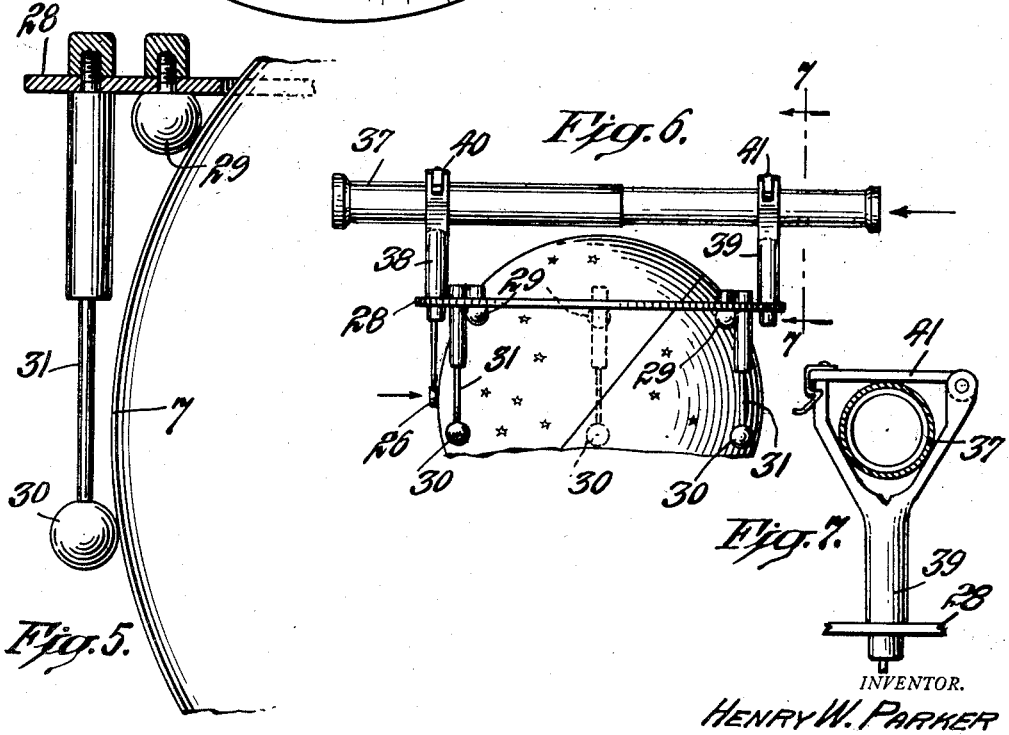
INVENTOR.
HENRY W. PARKER
BY
ATTORNEY

United States Patent Office 2,697,280
Patented Dec. 21, 1954

2,697,280

INSTRUMENT FOR LOCATING CELESTIAL BODIES

Henry W. Parker, Flushing, N. Y.

Application February 24, 1953, Serial No. 338,450

1 Claim. (Cl. 33—61)

The invention disclosed in this patent relates to apparatus for locating and identifying stars and other elements of the celestial system.

The general purposes of the invention are to provide a simple and inexpensive form of apparatus which may be used without special training or skill, which can be quickly set up and adjusted and which will be accurate and reliable in action.

It is a purpose of the invention also to provide such apparatus in a small, compact, light weight, transportable form which can be readily carried about and set up where observations can best be made.

Other objects of the invention and the novel features through which the objects are attained are set forth and will appear in the course of the following specification.

The drawings accompanying and forming part of the specification illustrate present practical embodiments of the invention. Structure, however, may be modified and changed as regards the immediate illustration, all within the true intent and broad scope of the invention as hereinafter defined and claimed.

Fig. 1 in the drawings is a side elevation showing the invention in use and with the tripod support indicated broken away;

Fig. 2 is a broken front view of the device looking in the direction of the arrow 2 in Fig. 1, and showing the member for locating a particular star positioned over that star indication on the celestial globe;

Fig. 3 is a front elevational view showing how with the locating member centered over a star on the globe, the adjustable support which carries this member will hold the sighting means pointed on the designated star in the sky even though tilted to different positions on the globe;

Fig. 4 is a top plan view looking down on the ring which supports the locating member and the sighting means in universally adjustable relation on the globe;

Fig. 5 is an enlarged broken sectional detail taken on substantially the plane of line 5—5 of Fig. 4 and showing one set of the opposed bearings for mounting and yieldingly confining the supporting ring on the globe;

Fig. 6 is a broken side elevation illustrating the use of a telescopic form of sighting means;

Fig. 7 is an enlarged broken detail as on substantially the plane of line 7—7 of Fig. 6.

Briefly considered, the invention comprises a celestial globe carrying representations or designations of the celestial bodies arranged in their proper order, with means for supporting and positioning this globe with the elements located according to latitude and time at the point of observation, and a support universally adjustable about the center of the globe and carrying a locating member which by adjustments of the support, can be centered over a star or other designation on the globe, and sighting means which by reason of such adjustment will be automatically pointed in the direction of the element sought.

The celestial globe is designated 7 and is shown as supported on its polar axis by a spindle 8 journaled at the lower end in a bearing 9.

This bearing is shown as carried by a bracket 10 adjustable about a bolt center 11 on the upper end of a post 12 adjustable for vertical positioning in a clamp socket 13. The latter is indicated as pivotally adjustable at 14 in a head 15 carried by extensible tripod legs 16.

The tripod structure may be similar to that for a camera, providing vertical adjustments for height, orienting adjustments about a vertical axis and levelling adjustments, the latter accomplished as by a small plumb bob indicated at 17.

Angular adjustment of the bracket 10 about the bolt center 11 enables the axis of the globe to be set to the inclination of the earth at the latitude of observation, and when this adjustment has been made the bolt 11 may be tightened to hold the bracket 10 with the spindle 8 inclined to that particular angle.

The spindle 8 is shown as having a month dial 18 fixedly secured as by a pin 19 in proper relation to the designations on the globe, and below that dial there is shown a meridian dial 20 rotatable on the spindle and which can be adjustably clamped to the first dial by a knob 21 engaged over the lower screw threaded portion 22 of the spindle.

After turning the lower dial to carry the meridian sign thereon into register with the day of the month on which the observation is being made, the screw clamp 21 may be tightened to lock the month, day and hour designating members together.

Then, upon turning the globe, spindle and time designating members all as one unit, the instant month, day and hour designations may be brought into register with a fixed reference center or eye 23 on the bracket, positioned to thereby locate the globe with the designations thereon correspondingly located for that time.

When the adjustment for time is completed the globe may be clamped in that position by means of a clamp screw 24 supported by a stud 25 in position to grip the rim of the lower dial 20.

The member for locating different stars or elements on the globe is shown as an eye 26 supported over the equatorial section of the globe by a stem 27 dependent from the annular support ring 28.

This ring is shown as of smaller internal diameter than the globe and as supported over the top of the globe by three triangularly related balls 29 riding the surface of the globe. The ring is shown confined in this relation by ball-like bearing members 30 engaging a smaller diameter portion of the globe on the opposite side of the equator from the supporting bearings 29.

The retaining bearings 30 are shown carried by resilient stems 31 dependent from the ring 38 and set to hold the balls 30 in yielding frictional engagement with the globe.

This construction enables the supporting ring to be slipped into position over the globe or to be removed with a slight springing action, and the friction engendered by the spring stems 31 is preferably sufficient to hold the supporting ring in any position to which it may be adjusted on the globe.

Various forms of sighting devices may be employed. As shown in Figs. 1, 2 and 4, such means may consist simply of a pair of front and rear sights 32, 33, lined up on the supporting ring at diametrically opposite sides of the globe center, and with the front sight in vertical alignment with the eye member 26.

These front and rear sights are shown carried by upright stems 34, 35, on the ring, supporting them at a level above the top of the globe so that the line of vision represented by the arrows 36, Fig. 1, will be clear of the top of the globe and parallel with a diametrical line extending through the center of the globe toward the star or other emblem over which the eye 26 is located.

Thus the adjustment of the star selecting eye 26 over a star on the globe has the effect of pointing the sighting means in the direction in which that particular star can be seen in the heavens.

Fig. 3 shows how this is true whether the supporting ring 28 is level or tilted in various angular relations, the only requirement being that the guiding and positioning element 26 be located over the celestial element which is being sought.

To aid in reading figures on the globe, the globe may be internally or otherwise illuminated.

The parts are few and of simple construction and the whole apparatus may be made compact and light enough to be carried about by one person. The adjustments are simple and easily understood.

The globe may be turned at intervals, according to passage of time and, if desired, a time train may be utilized to keep the globe synchronized with passage of time.

The tripod mounting of the supporting ring keeps the ring centered regardless of angular adjustments over the globe, but other mounting means accomplishing the same results may be employed.

Figs. 6 and 7 show a form of finder or sighting means embodying a telescope 37 centered and removably held in the forks of sighting yokes 38, 39, by overstanding clamps or latches 40, 41.

Adjustment of the bracket or base 10 to set the globe at the proper inclination for the point of observation may be accomplished with the aid of an ordinary protractor, or a protractor scale and pointer may be provided right on the supporting standard 12 and base 10, substantially as indicated at 42, Fig. 1. Once this adjustment is made for a particular locality the base may be left secured in that position.

Then, when the instrument is to be used it will only be necessary, after levelling the tripod at the height desired for convenient observation, to turn the whole base structure about the vertical axis 14 to point the polar axis represented by the spindle 8 in the direction of the Polar star and to set the meridian point "M" of the adjustable time scale 20 in line with the present day of the month on the fixed scale 18, and whereupon by rotating the globe on its axis to bring the indication of the hour at that time under the stationary reference gage 23, the globe will be oriented to locate the indications thereon in line with corresponding elements in the sky.

The pointing of the axis to the North star may be effected by direct observation and possibly checked for accuracy by the sighting means after the locating member 26 has been placed over the polar designation on the globe.

This and other adjustments for finding different stars, planets, constellations and the like, can be quickly and easily effected without attention to angularity of the support on the globe, Fig. 3, making it clear that it is only necessary to position the locating member 26 over the indication of the desired element, this single adjustment without calculation or other time consuming operation serving to point the sights in the direction of that element in all and any inclined relations of the support on the globe—this being true because of the fact that the support has universal adjustment about the center of the globe and the locating member is supported at the equatorial section of the globe, therefore always in line with a diameter of the globe, and the sights are always lined up parallel with these diametrical axes.

The finder mechanism, that is the support with the locating member and sights, can be set in operative position by simply springing it over the globe and the spring holding action of the lower set of bearings 30 is preferably such as to frictionally hold these parts in any position to which they may be adjusted.

What is claimed is:

Instrument for locating elements of the celestial system comprising a celestial globe, means for positioning said globe with the celestial elements represented thereon in proper relation according to latitude and time at point of observation, a ring encircling a portion of the globe, globe engaging supports carried by said ring in riding engagement with the globe at one side of an equatorial plane of the globe, bearing members carried by the ring and engaging the globe at the opposite side of said equatorial plane and thereby confining and holding said ring in universally adjustable relation on the globe, a star locating member dependent from the ring and positioned thereby in line with said equatorial plane and in line with an axis extending through the center of the globe and sighting means extended upwardly from opposite sides of said ring, one in line with said star locating member and the other at the diametrically opposite side of the ring and on a line parallel with said axis passing through the center of the globe and whereby any adjustment of the ring on the globe to set said locating member over a star represented on the globe will position said sighting means in line with the actual star in the sky.

References Cited in the file of this patent

UNITED STATES PATENTS

| Number | Name | Date |
|---|---|---|
| 2,349,515 | Oberst | May 23, 1944 |
| 2,399,365 | Link | Apr. 30, 1946 |

FOREIGN PATENTS

| Number | Country | Date |
|---|---|---|
| 1,592 | Great Britain | Apr. 20, 1878 |
| 204,005 | Germany | Nov. 6, 1908 |
| 147,690 | Great Britain | Sept. 15, 1921 |